(12) United States Patent
Gray (10) Patent No.: US 12,101,289 B2
(45) Date of Patent: Sep. 24, 2024

(54) SYSTEMS AND METHOD FOR CREATING EVENT PROFILES, SENDING NOTIFICATIONS TO REMIND OF EVENTS, AND ENABLING SENDING RELATED MESSAGES

(71) Applicant: Steven Gray, Salt Lake City, UT (US)

(72) Inventor: Steven Gray, Salt Lake City, UT (US)

( * ) Notice: Subject to any disclaimer, the term of this patent is extended or adjusted under 35 U.S.C. 154(b) by 0 days.

(21) Appl. No.: 18/108,813

(22) Filed: Feb. 13, 2023

(65) Prior Publication Data

US 2024/0275755 A1 Aug. 15, 2024

(51) Int. Cl.
G06F 15/16 (2006.01)
H04L 51/046 (2022.01)
H04L 51/52 (2022.01)

(52) U.S. Cl.
CPC ............ H04L 51/52 (2022.05); H04L 51/046 (2013.01)

(58) Field of Classification Search
CPC ........ H04L 51/52; H04L 51/046; H04L 51/56
USPC .................. 709/206, 204, 203, 217
See application file for complete search history.

(56) References Cited

U.S. PATENT DOCUMENTS

| | | | |
|---|---|---|---|
| 2009/0060162 A1* | 3/2009 | Lachhiramka | H04M 3/527 379/214.01 |
| 2012/0260190 A1* | 10/2012 | Berger | H04L 67/02 715/739 |
| 2013/0246524 A1* | 9/2013 | Berner | G06Q 50/01 709/204 |
| 2014/0279205 A1* | 9/2014 | Ganesh | G06Q 50/01 705/26.7 |
| 2014/0324720 A1* | 10/2014 | Ye | G06Q 10/00 705/319 |
| 2017/0098284 A1* | 4/2017 | Schneider | G06Q 10/1095 |
| 2017/0099248 A1* | 4/2017 | Pisenti | H04L 51/10 |
| 2017/0357382 A1* | 12/2017 | Miura | G06F 16/438 |
| 2020/0403957 A1* | 12/2020 | Holwill Rauch | H04L 51/212 |
| 2021/0056491 A1* | 2/2021 | Saito | G06Q 10/063116 |
| 2021/0192464 A1* | 6/2021 | Hsu | G06F 3/0481 |

* cited by examiner

*Primary Examiner* — Kaylee J Huang (57) ABSTRACT

A method, system, and/or graphical interface, and/or combination thereof, for reminding of important events. Method embodiments may include one or more of the following steps: identifying at least one contact associated with a user; creating or importing at least one profile associated with the identified at least one contact; determining at least one calendar date related to at least one event associated with each identified at least one contact; converting the at least one created or imported profile to at least one corresponding event profile; receiving instructions from the user associated with the at least one event profile; and sending or not sending, based at least in part on the at least one event profile, a notification to the user associated with one event of the at least one event. In some examples, the at least one event profile may be associated with the at least one determined calendar date.

20 Claims, 5 Drawing Sheets

SYSTEMS AND METHOD FOR CREATING EVENT PROFILES, SENDING NOTIFICATIONS TO REMIND OF EVENTS, AND ENABLING SENDING RELATED MESSAGES

CROSS REFERENCE

This application claims priority to U.S. Provisional Application No. 63/309,550, filed on Feb. 13, 2022, the contents of which are incorporated herein by this reference as though set forth in their entirety.

FIELD OF INVENTION

A system and/or method relating to the field of managing, organizing, and using information to remember important events and facilitate productive actions related to such events.

BACKGROUND

Many people have trouble remembering birthdays and other important dates (e.g., commemorating important events). Part of the problem is insufficient reminders, and the steps needed to send a message to a person associated with the important date. For example, the important dates may not be written down. Even when they are written down on a calendar or in a notebook, such items may not be looked at frequently, or may not be located close enough to people (who would like to remember the dates/event) on the important dates. As a result, the people do not see the written reminders on the dates of the important events when they most need to.

Even when persons may notice the reminders, they may see them at an inopportune time to do something about them. In addition, (sadly) sending a celebratory message may require just enough work for the sending to be avoided. For example, a person may look at a calendar while in the middle of an important task, and may not be in a good position to send a celebratory message in that moment, which may (for instance) require looking up a contact while driving, or while engaging in work. Regardless of the precise reasons, in such circumstances, and despite good intentions to send the message later, the reminder is often forgotten and/or not acted on.

SUMMARY

Described herein may be a system configured, and/or a related method, for reminding of important events. In some examples, the method may include identifying at least one contact associated with a user. In some examples, the method may also include creating or importing at least one profile associated with the identified at least one contact.

In some examples, the method may also include determining at least one calendar date related to at least one event associated with each identified at least one contact. In some examples, the method may also include converting the at least one created or imported profile to at least one corresponding event profile. In some examples, the at least one event profile may be associated with the at least one determined calendar date.

In some examples, the method may also include receiving instructions from the user associated with the at least one event profile. In some examples, the method may also include sending or not sending, based at least in part on the at least one event profile, a notification to the user associated with one event of the at least one event.

In some examples of the method the notification may be configured to remind the user of the event. In some embodiments, the sending or not sending may be based at least in part on the instructions from the user.

In some examples, the instructions from the user may be to send the notification. In some embodiments, the instructions may further instruct to send the notification in a manner according to at least one preference of the user. In some examples, the at least one preference of the user may include at least one of a preferred time of day, a preferred frequency, a preferred timeframe in advance of the at least one calendar date related to the at least one event, and sending repeated notification until an associated message is sent by the user.

In some examples of the method, the notification may include sending a push notification to the user mobile phone. In some examples, the at least one of the at least one created or imported profile may be imported from a list of contacts in database of a mobile phone of the user.

Some examples of the method may include sending a message to a first contact associated with a first event profile of the at least one event profile. In some embodiments, the message to the first contact may include a message associated with a social media or similar platform. Some examples of the method may include sending a message to a first contact associated with a first event profile of the at least one event profile. In some embodiments, the sending the message is based at least in part on the notification. In some embodiments, the sending the notification to the user and the sending the message to the first contact may be enabled within the same mobile app. In some embodiments, the message sent to the first contact may be a text or an SMS message.

In some examples, the message to the first contact may be a message associated with a social media or similar platform. In some such embodiments, the manner of sending the message to the first contact may be according to at least one user preference. Some method examples may further include the steps of obtaining permission of the user associated with the social media or similar platform, and obtaining permissions of a group of users associated with the social media or similar platform. In some such embodiments, the user may be a member of the group of users. Some examples of some of aforementioned embodiment may include, prior to obtaining permissions of the group of users, sending invitations to the group of users, based on at least one action of the user.

In some method examples, the at least one event profiles may include a group of associated event profiles based at least in part on a religious holiday, a holiday specific to a particular country or set or countries, or a holiday specific to a culture or set of cultures.

Some method examples may also include steps of generating a calendar, and syncing the calendar with the at least one event profile, wherein the calendar comprises the at least one calendar date associated with at least one event profile. Some method examples may also include displaying the calendar together with a message informing the user of a first date of the at least one calendar date associated with a first event profile of the at least one event profile. Some embodiments may further include displaying on the first date at least one of a symbol and color associated with the first event profile.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein-including their organization and method of operation-together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components-including those having a dash and a second reference label-apply to other similar components. If only the first reference label is used in the specification, the description is applicable to any one of the similar components having the same first reference label irrespective of the second reference label.

DESCRIPTION

Files on computers, tablets, and/or mobile devices may provide better options for receiving reminders of important dates. However, not everyone looks to the particular files where such reminders might be stored.

Reminders on electronic calendars such as Google Calendar or Outlook are useful, but also entail drawbacks. For example, some such calendars may be used primarily for work purposes, and thus may not be appropriate for personal use. In addition, once personal reminders are added into the calendars, a person may eventually switch employers, and thus access to the calendars (including to the reminders stored in therein) may be lost. Such electronic calendars may also be cluttered with other information, diminishing the likelihood of the important reminders standing out.

Reminders such as those provided by Facebook for birthdays are also helpful, but not everyone uses particular social media platforms such as Facebook, let alone frequently. Thus, relying purely on Facebook emails to remember birthdays will naturally exclude a cross section of contacts, friends, and family, making important events relating to those persons are even harder to remember. In addition, due to the volume of emails many people receive each day (including from Facebook), many people will ignore such messages, even when they contain important information.

In addition, users may want to wish some Facebook friends happy birthday but not others. Yet such Facebook birthday reminders may be for all Facebook friends, many of whom may not even be casual acquaintances with a particular user. And not having identified/sorted those friends beforehand may render it difficult to do so in the moment, or the day, that a reminder is received by email notifying of all Facebook friends' birthdays. Further, seeing a Facebook email, then clicking on it, logging into Facebook, hitting a notifications tab, clicking on a user's profile, leaving a message, and then repeating the process several times may also be just sufficiently time-consuming as to deter performance of the tasks. As a result, some people may respond to such reminders by sending out birthday messages occasionally but not routinely. Even those social media savvy users who have the tenacity to check their Facebook emails and send out birthday notifications regularly/daily may welcome an easier system.

Relying on Facebook birthday emails may also entail some drawbacks of social medial use generally. For example, some people dread maintaining a social media presence, logging into a cyber world, facing a myriad of notifications, posts, invites, stories, ads, and videos, which may often be presented to users without their selection, and may be generated to capture users' attention for as long as possible. Such use of social media by some may generate stress, anxiety, unhealthy comparisons with others, and even lead to hours of wasted time. Yet on the other hand, neglecting online relationships, and in particular chronically forgetting important dates/events of special people may lead to feelings of guilt and embarrassment.

In addition, while Facebook birthday reminders may apply only for birthdays, there may be other annual dates/ events that users wish to remember. Even if remembered, due to the often-hectic activities of daily life, such events may catch a person "flat-footed," leaving it a challenge to take the necessary steps to appropriately celebrate that event by, for example, contacting someone special.

In addition, using some existing platforms, notifications regarding birthdays may be lost in the humdrum of other daily emails, and might not grab a user's attention sufficiently. Similarly, some other platforms may be used by other purposes, lessening the likelihood that a user will think to use such platforms specifically to remember birthdays or other events. Also, platforms that simply remind of such event or birthdays are usually able to also offer users convenient options to also send birthday notifications. In addition, many such platforms may not be offer a user the ability to customize how to be reminded of important events for contacts and friends.

Described herein is a system and/or method that addresses at least some of the aforementioned problems. The system and/or method may not only more effectively remind of important events, such as birthdays, anniversaries, etc., of contacts, friends, family, etc., but may also enable sending messages to special persons more easily and in some cases automatically.

Figure 1:
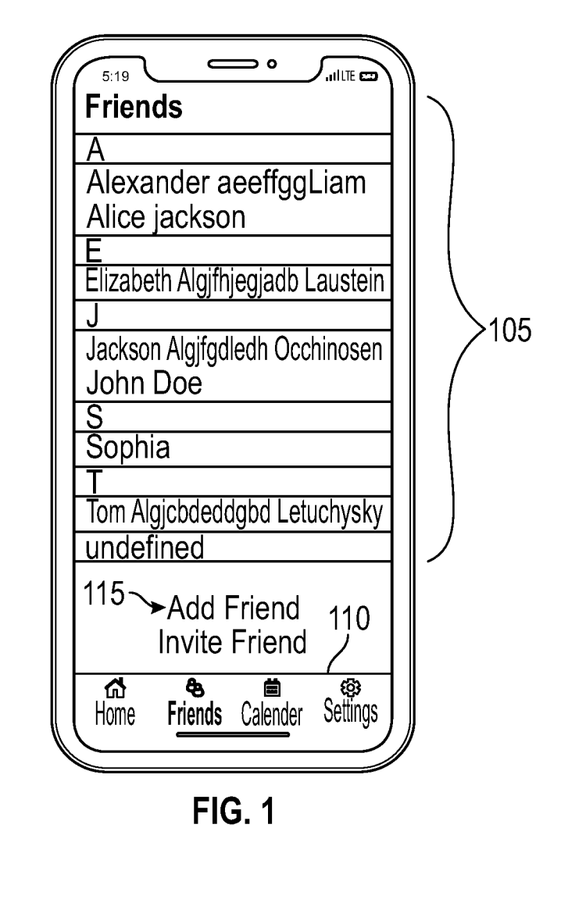
FIG. 1 shows a graphical interface page of a system embodiment in accordance with various aspects of this disclosure.

As illustrated in FIG. 1, the system may be configured to perform, and the method may include, creating and/or importing profiles associated with the identified contacts. For example, the system may include a list 105 or database of such contacts. In one embodiment, the system may be kept on a user's mobile device. The contacts may be added/created manually or imported. For example, the contacts may be imported from a user's mobile device's list of contacts. For instance, at the click of a button on a corresponding icon 110, a user may access contacts in a phone and import the selected contacts or profile into the list 105. In this manner, embodiments may involve importing contacts regardless of whether they use social media, or are connected through social media.

In some cases, the contacts in the phone may include other data that may also be imported. For example, a contact in the phone may already include data indicating a birthday for the contact, which can then be automatically imported along with the contact. In some cases, embodiments may automatically detect whether imported data is accurate, and if inaccurate may take steps to correct the data before or after importing. For example, a phone number associated with a contact may inadvertently have been inputted initially as a "home" phone when it is actually a "mobile" phone (or vice versa). In some embodiments, the erroneously indicated "home" phone may be identified as actually, or likely, being a mobile phone, and may consequently be imported as a mobile phone associated with the new profile.

In some embodiments the imported profiles may be saved locally to a user's device (e.g., phone). In this manner, identifying information of contact may not be shared with third parties. In other embodiments, the imported profiles may be saved onto a database located extraneous to the user device (e.g., in the "cloud"). In some embodiments, prior to a user selecting what contacts from a phone to import as profiles, the phone contacts (e.g., phone numbers) may be compared to contacts or profiles already included in the database. Based on such comparing, a match between one or more phone contacts (e.g., phone numbers) and database contacts and/or profiles may be determined. In such instances, in some embodiments, prior to selecting what phone contacts to import, the user may be presented with a visual indication of such "matched" contacts. If such matched contacts are then selected to be imported, additional data associated with the contacts stored on the database may also be imported. For example, the birthdays of such contacts may be stored on the database and then imported.

Additionally, or alternatively, data associated with such contacts may be stored on the database relating to preferences, such as relating to privacy and permissions. For instance, such privacy and permission preferences may include whether an email can be shared with others who have the contact's phone number in their phones, whether the contacts have provided consent (whether or not required by applicable laws) to receive automated emails and/or text messages from another person based in part on platform embodiments, a preferred mode of receiving a birthday notification (e.g., via text, email, phone call, social media, etc.), or a preferred birthday gift.

Figure 2:
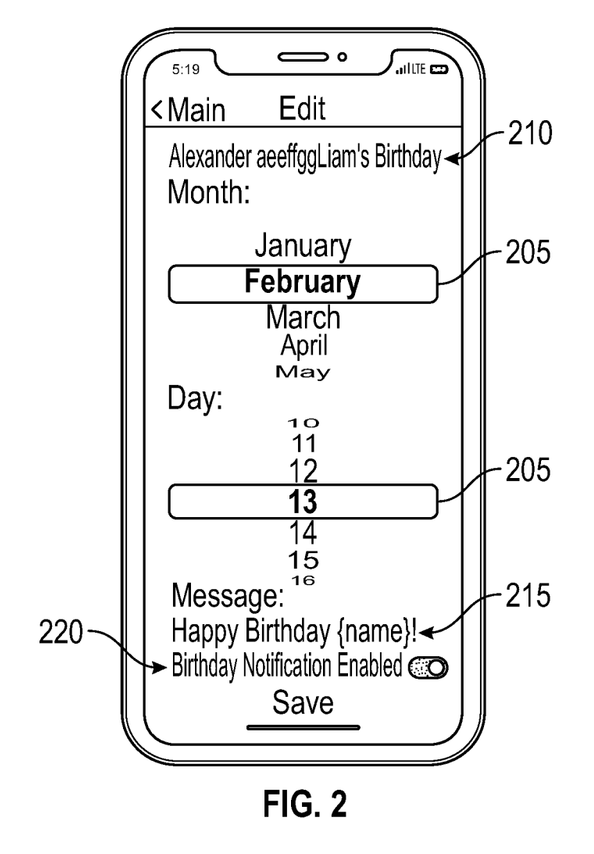
FIG. 2 shows another graphical interface page of a system embodiment in accordance with various aspects of this disclosure.

As shown in FIG. 2, once a profile is created or imported (or as part of that process), the system may be configured to assign, or the method may include assigning, an event profile to a contact. The event profile may include the name of the individual/contact being imported. The event profile may also include contact information relating to one or more ways of sending notifications to the individual—for example, a phone numbers, an email, a social media handle, etc. Relatedly, the method may include determining a specific date 205 related to an event associated with the identified contact, such as a birthday, and creating an event profile 210 for the contact, wherein each event profile is associated with the determined specific dates;

In addition, the user may pre-draft a message 215 to send to the contact. Such a pre-drafted message may be copied to a clipboard of the user when preparing a message to send to the recipient. For example, predetermined birthday messages may be automatically copied onto a user's clipboard to with the contacts happy birthday. This may save the user time and steps when it is the proper moment for sending the message. In some embodiments, a message may be customized by attaching or incorporating saved images such as photos or memes. In some embodiments, one or several preferred birthday messages may be selected as part of a setup process, which may then automatically be applied as the message 215. In some embodiments, such selected preferred messages may be randomly assigned to different contacts. In some embodiments, the name of a contact may be automatically imported into a pre-selected message without requiring the user to input or type the name.

In some embodiments, the method may also include sending a notification to the user to remind the user to send a message to a contact associated with an event profile. For example, one icon/button 220 of the event profile may be selected so that the user receives the notification, thereby notifying the user of the important events.

The system may be configured for, and/or the method may include, sending notifications reminding the user when the important events are close or are occurring. In some embodiments, a user may select certain preferences associated, for example, with the frequency and time of receiving the notification.

For instance, a user may prefer a particular time of day to receive such notifications when the user is more likely to be able to take actions based on such notifications, such as sending a message to a contact. Another user may prefer to receive such notifications first-thing in the morning. Another user may be mindful of the time zone in which a contact resides, and therefore may want to receive a notification and send a message at a time when the contact is, for example, awake. Thus, in some embodiment a preferred time of receiving the notification may be specific to particular contacts, or groups of contacts (e.g., who live in the same time zone).

Events may also be specific to contacts and/or groups of contacts, and/or to contacts of particular nationalities and/or cultures. For example, some contacts may celebrate Chinese New Year, and a user may wish to remember to send celebratory messages to such contacts. Other contacts may celebrate Dia de los Muertos, or Dia del Amigo, or Canadian thanksgiving, or religious holidays, etc., and a user may desire to send celebratory messages to the proper contacts or groups of contacts accordingly. Other events pertaining to groups may include Mother's Day for a mother or groups of mothers, Father's Day for a father or groups of fathers, Valentine's Day, Veteran's Day, etc.

Other preferences relating to receiving notifications may specify receiving more than one notification for a particularly important event. In some embodiment the system may keep track regarding whether the user sends a message (in ways that are explained more fully below) to a contact based on a determined event, for example, in response to receiving a notification. Where no celebrating message has been sent by a predetermined time, the user may choose to receive another notification, or even multiple notifications in a single day until a message is sent.

Figure 3:
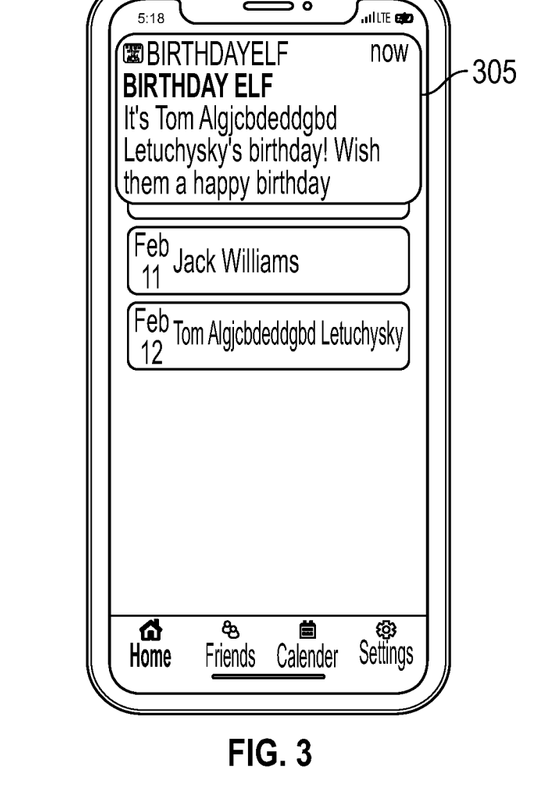
FIG. 3 shows another graphical interface page of a system embodiment in accordance with various aspects of this disclosure.
Figure 4:
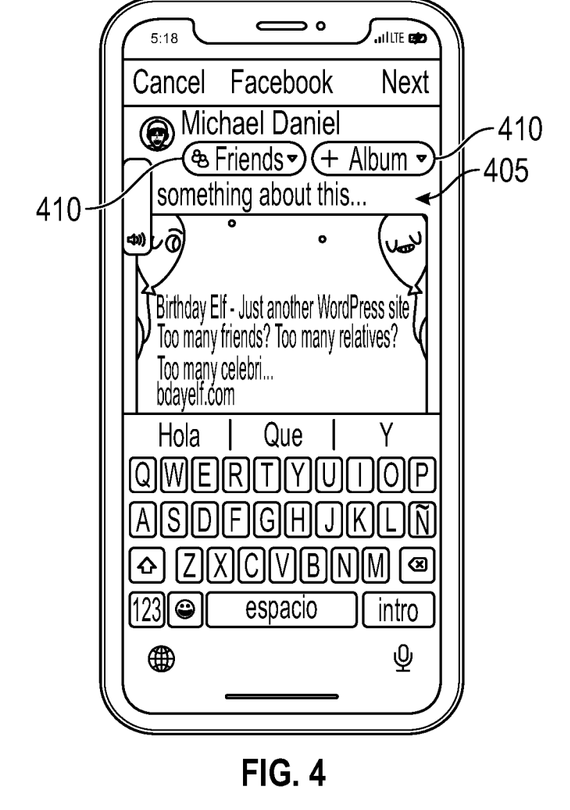
FIG. 4 shows another graphical interface page of a system embodiment in accordance with various aspects of this disclosure.

As shown in FIG. 3, in some embodiments, such notification reminders may include a push notification 305 on a user's personal mobile device. Such push notifications may be clicked by a user, which, as shown in FIG. 4, may bring the user directly to an interface within the system and/or platform (which is some embodiment may include a mobile app), through which the user write and send a message 405 to the contact. In some embodiment the user may paste an automatically drafted message from the clipboard (see e.g., pre-drafted message 215 of FIG. 2). For example, in some embodiments a user may wish a contact happy birthday.

In some embodiments, the sending of a notification may occur directly through social media and/or similar platforms. In some examples, such sending may occur without the user having to take additional steps to log into and navigate through such social media and/or similar platforms. In some embodiments, this may be accomplished by the user using credentials from such social media and/or similar platforms to log-in to or to create an account associated with the system.

Figure 5:
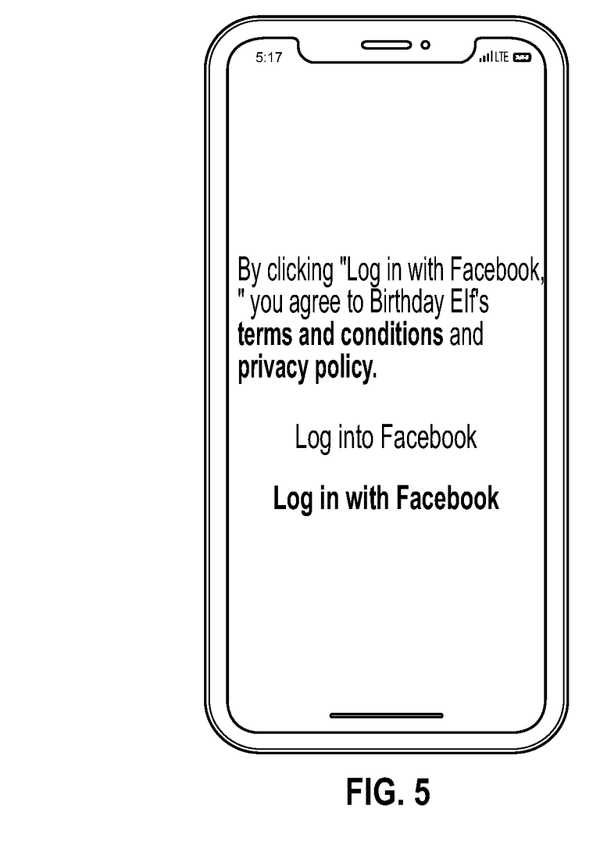
FIG. 5 shows another graphical interface page of a system embodiment in accordance with various aspects of this disclosure.
Figure 7:
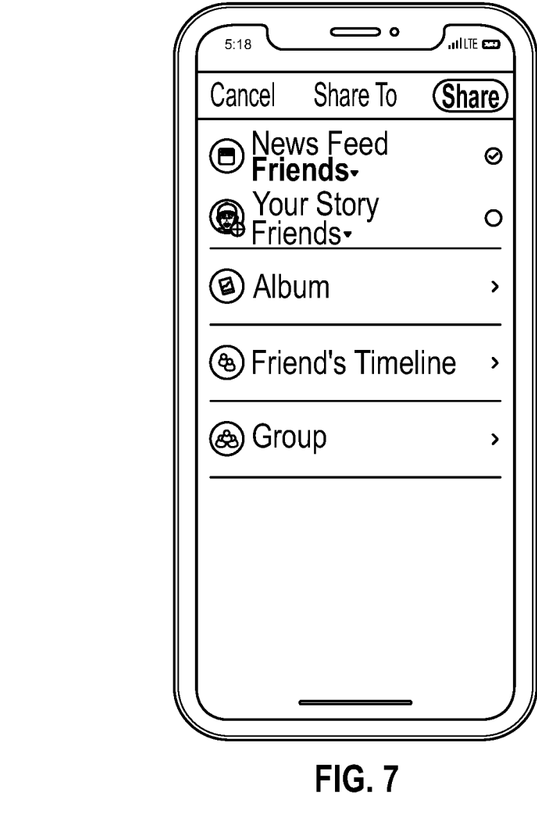
FIG. 7 shows another graphical interface page of a system embodiment in accordance with various aspects of this disclosure.

For example, in some embodiments, such a social media platform may be Facebook, and a user may be asked to log in using Facebook credentials, as shown in FIG. 5. Accordingly, as shown in FIG. 4, a user may send a message such as a birthday wish, which may be directly posted a to a contact's Facebook wall. In some examples, a user may also select 410 who may see the birthday wish and otherwise control aspects of how the message is viewed by others, or by certain groups, etc., as also shown in FIG. 7.

In additional or alternative embodiments, the user may send a message to contact via a text message or email to the contact. In some embodiments, clicking on the notification (e.g., push notification) may similarly bring the user to screen for sending such a text message and/or an email. In some embodiments, the user may express a preference for what type of message to send to a contact/imported profile (e.g., social media post, text message, and/or email).

In some examples, celebrating messages may be sent automatically to contacts/imported profiles in a manner specified. For example, a preselected celebrating message may be sent by email to a contact/imported profile automatically, without requiring any additional user action than initial instructions. In some embodiments, in such initial (or subsequent) instructions, the user may indicate that such automatic messages by sent annually, and also instruct that the content of the message change each year. In some embodiments, the user may be also be sent a confirmation (e.g., as a push notification) informing that the celebrating message was sent (e.g., automatically sent), which may also occur automatically without additional user instructions required.

In some examples, in addition to sending message consisting solely of words/text, a user may also draft and send images, photos, GIFs, memes, short videos, etc. Similarly, in addition to pre-drafted message consisting solely of words/ text, some pre-drafted messages may also include images, photos, GIFs, memes, short videos, etc.

In some embodiments, the system may also be configured for, and/or the system may include purchasing gifts for contacts. For instance, the user may purchase flowers, or foods such as chocolates, etc., to send to a contact. In some such embodiments, notifications may be sent at an early enough date prior to the remembered event, to allow for purchase and delivery of such gifts. For example, a user may choose to receive a first notification two weeks prior to an event, and clicking on the notification may allow the user to order and purchase such gifts.

In some embodiments, a contact's profile may also include a delivery address so that the user need enter less information in order to make a purchase and have a delivery scheduled. In some embodiments, the user may also purchase and choose to have sent letters and/or cards to contacts. In some embodiments, such purchases of gifts and/or cards may be fulfilled through third party vendors. In some examples, such vendors may pay a fee to offer their services and goods through the system, or may pay a percentage of purchases through the system.

Figure 6:
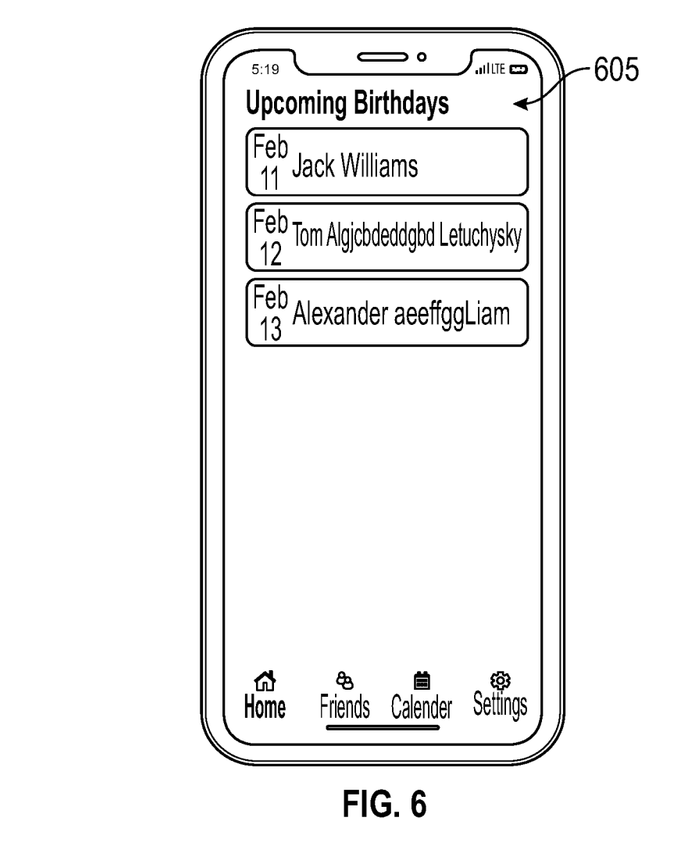
FIG. 6 shows another graphical interface page of a system embodiment in accordance with various aspects of this disclosure.

In some examples, and as shown in FIG. 6, the system and/or method may include a list of upcoming events, such as birthdays 605. In some embodiments, the user may select how many days prior to an event that the contact and associated event will be displayed in the list. For example, a user may select for all birthdays to be shown two days prior and two days after the date of the birthday.

Figure 8:
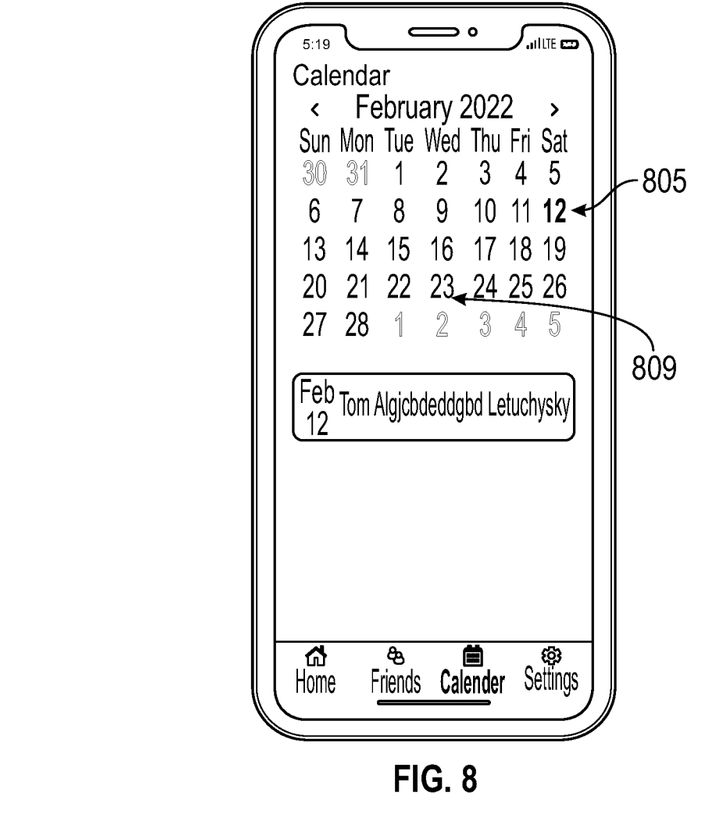
FIG. 8 shows another graphical interface page of a system embodiment in accordance with various aspects of this disclosure.

The system may also include a calendar, an example of which is shown in FIG. 8. In some examples, important events may be marked on dates of the calendar using colors. For instance, a day featuring an event may be shown in green font 805, while a day that does not feature any events may be shown in black font 810.

Some embodiments of the calendar may feature colored icons. In some embodiments, the colors and/or icons may be associated with preset actions (or lack or actions) corresponding to events and contacts. For example, where an event associated with a contact's profile is a birthday that will trigger a notification, a green circle might show underneath the date. On the other hand, a red circle may indicate that the user has chosen not to receive a notification for the event. A different icon, such as a square or a triangle, may indicate a different event, such as an anniversary.

In another aspect, created/imported contacts may be invited to use the system/platform. For example, by clicking on an icon 215 as shown in FIG. 2, a user may be taken to a list of mobile phone contact profiles corresponding to the user's mobile phone database. The user may select which contacts to send a text message or email inviting the contacts to use the system (which may be in some embodiments be a mobile app), which message may include a link and/or instructions for acquiring the system.

In some embodiments, whether when sending an invitation to use the system, or when importing contacts from a mobile phone's database to create event profiles, the system may be configured for, and/or the method may include, identifying contacts where a phone number may have been erroneously stored in the mobile device. For example, some numbers may have been originally inputted as "home" phone numbers instead of as numbers associated with a mobile device. Some embodiments of the system may not enable full functionality of features (e.g., sending text or SMS messages) unless the phone number associated with an event profile is a mobile phone number. Accordingly, the system may be configured for, and the method may include, prompting a user where such phone numbers may be erroneously labeled in mobile phone's database of contacts.

In some embodiments, if the invitations are accepted by contacts, the created/imported contacts may grant certain permissions to use certain features between the inviting user and the contacts, or between other contacts associated with each other that have registered for the system (e.g., created mobile app accounts), or between all users of the system. For example, in some embodiments, users of the system with particular social media and/or similar platform accounts may grant permission (if such permissions are required) to one another to user the system in connection with the social media and/or similar platform in order to remember important events or send corresponding messages. In some embodiments, for instance, Facebook users may agree to use the system between themselves to leave birthday wishes on walls through Facebook posts.

Figure 9:
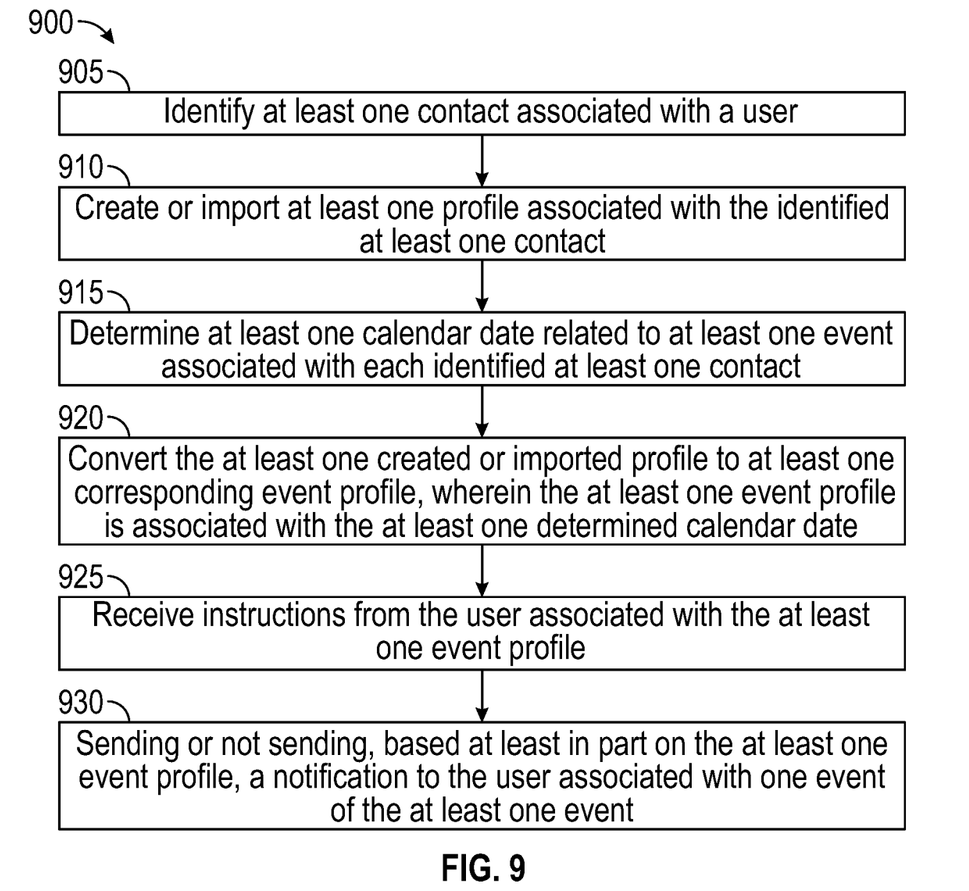
FIG. 9 shows flow chart illustrating an example of a method in accordance with various aspects of this disclosure.

As shown in the flowchart in FIG. 9, one or methods for reminding of important events is described herein. One example method 900 may include, at step 905, identifying at least one contact associated with a user. The method 900 may also include, at step 910, creating or importing at least one profile associated with the identified at least one contact.

The method 900 may also include, at step 915, determining at least one calendar date related to at least one event associated with each identified at least one contact. The method 900 may also include, at step 920, converting the at least one created or imported profile to at least one corresponding event profile, wherein the at least one event profile is associated with the at least one determined calendar date.

The method 900 may also include, at step 925 receiving instructions from the user associated with the at least one event profile. The method 900 may also include, at step 930, sending or not sending, based at least in part on the at least one event profile, a notification to the user associated with one event of the at least one event.

One of more steps described here may be automated, and occur automatically, without additional actions required of a user. For example, the identifying at least one contact associated with a user may occur automatically, based on a backend database of enrolled users. In some embodiments, and as also described above, the backend database may be automatically compared with the contacts in a user's phone, by for example, matching a phone number saved locally in a user's phone with a phone number provided with another user at registrations. Other data may able be similarly matched, such as an email address, name, birthdate, or any other identifying information, or combination thereof.

Creating or importing at least one profile associated with the identified at least one contact, may also occur automatically, or with minimal actions required of a user. In some other examples, such automatic importing may have been authorized or preselected by the user. In some examples, the user may be presented with a list of matched profiles for approval prior to importing.

In some examples, determining at least one calendar date related to at least one event associated with each identified at least one contact may also occur automatically. In some examples, such determining may be based on information the identified contacts previously provided based on their registration. In some examples, such dates may be pulled from social media sites, etc.

In some examples, converting the at least one created or imported profile to at least one corresponding event profile may able occur automatically. In some embodiments, the receiving instructions from the user associated with the at least one event profile may have occurred at a previous time prior to the converting. For example, the user may have created or approved a rule applicable to later converting to event profiles, for all identified contacts.

In some examples, the sending a notification to the user associated with one event of the at least one event may not only occur automatically, but multiple different types of notifications may be sent to identified contacts. For example, one contact might automatically receive on email on a predetermined days, while the user might receive a push notification reminder to send another contact a text message, with the user's phone automatically opening up a text message with predetermined content, for the user to approve, potentially revise and personalize, and then send. In the way, a user may be enabled to better manage relationships according to different contact, and be able to remember and celebrate important dates with others.

The operations and functions described herein may be applied or performed by a computer system. For example, described herein is also a system for reminding of important events and an (in some embodiments) automated system of sending notifications associated with the same. In some examples, the system may include a computer system having a hardware processor and a physical memory using executable instructions that, as a result of being executed by the hardware processor, cause the computer system to perform certain operations.

In some system embodiments, the executable instructions, as a result of being executed by the hardware processor, may cause the computer system to identify, by the hardware processor (or at least in part via the hardware), at least one contact associated with a user. In some system embodiments, the executable instructions, as a result of being executed by the hardware processor, may cause the computer system to create or import at least one profile associated with the identified at least one contact.

In some system embodiments, the executable instructions, as a result of being executed by the hardware processor, may cause the computer system to determine at least one calendar date related to at least one event associated with each identified at least one contact. In some system embodiments, the executable instructions, as a result of being executed by the hardware processor, may cause the computer system to convert the at least one created or imported profile to at least one corresponding event profile, wherein the at least one event profile is associated with the at least one determined calendar date. In some system embodiments, the executable instructions, as a result of being executed by the hardware processor, may cause the computer system to receive instructions from the user associated with the at least one event profile. In some system embodiments, the executable instructions, as a result of being executed by the hardware processor, may cause the computer system to send or not send, based at least in part on the at least one event profile, a notification to the user associated with one event of the at least one event. In some system embodiments, the executable instructions, as a result of being executed by the hardware processor, may cause the computer system to perform other operations and/or method steps described here, including any combination and any order thereof.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques.

These techniques, however, may be practiced without these specific details. In some instances, known structures and apparatuses are shown in block diagram form in order to avoid obscuring the concepts of the described examples.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Some aspects of the disclosure may involve computer-readable media. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for reminding of important events, including:
   identifying at least one contact associated with a user;
   creating or importing at least one profile associated with the identified at least one contact;

determining at least one calendar date related to at least one event associated with each identified at least one contact;

converting the at least one created or imported profile to at least one corresponding event profile, wherein the at least one event profile is associated with the at least one determined calendar date;

receiving instructions from the user associated with the at least one event profile;

sending or not sending, based at least in part on the at least one event profile, a notification to the user, wherein the notification comprises a reminder associated with one event of the at least one event, and wherein the notification comprises a push notification to a mobile phone of the user;

after sending the notification, receiving a signal from the user associated with the push notification; and in response to receiving the signal, automatically generating content for a message, based at least in part on the received signal, wherein the automatically generated content is predetermined based at least on the received instructions, and wherein the automatically generated predetermined content is editable by the user.

2. The method of claim 1, wherein the notification is configured to remind the user of the one event.

3. The method of claim 1, wherein the sending or not sending is based at least in part on the instructions from the user.

4. The method of claim 3, wherein the instructions from the user are to send the notification.

5. The method of claim 4, wherein the instructions further instruct to send the notification in a manner according to at least one preference of the user.

6. The method of claim 5, where the at least one preference of the user comprises at least one of a preferred time of day, a preferred frequency, a preferred timeframe in advance of the at least one calendar date related to the at least one event, and sending repeated notification until an associated message is sent by the user.

7. The method of claim 4, wherein the message is distinct from the notification.

8. The method of claim 7, wherein the at least one of the at least one created or imported profile is imported from a list of contacts in database of a mobile phone of the user.

9. The method of claim 1, further comprising sending the message to a first contact through a separate interface, wherein the first contact is a first contact of the identified at least one contact and is associated with a first event profile of the at least one event profile.

10. The method of claim 9, wherein the message to the first contact comprises a message associated with a social media platform.

11. The method of claim 7, further comprising sending a message to a first contact associated with a first event profile of the at least one event profile, wherein the sending the message is based at least in part on the notification and the message is associated with the automatically generated predetermined content editable by the user.

12. The method of claim 11, wherein the sending the notification to the user and the sending the message to the first contact are enabled within a same mobile app.

13. The method of claim 12, wherein the message sent to the first contact comprises a text or an SMS message.

14. The method of claim 11, wherein the message to the first contact comprises a message associated with a social media platform.

15. The method of claim 14, wherein the sending the message to the first contact is according to at least one user preference.

16. The method of claim 15, further comprising:
obtaining permission of the user associated with the social media platform; and
obtaining permissions of a group of users associated with the social media platform,
wherein the user is a member of the group of users.

17. The method of claim 16, further comprising, prior to obtaining the permissions of the group of users, sending invitations to the group of users, based on at least one action of the user.

18. The method of claim 4, wherein the at least one event profiles comprises a group of associated event profiles based at least in part on a religious holiday, a holiday specific to a particular country or set of countries, or a holiday specific to a culture or set of cultures.

19. The method of claim 1, further comprising:
generating a calendar;
syncing the calendar with the at least one event profile, wherein the calendar comprises the at least one calendar date associated with the at least one event profile;
and displaying the calendar together with a message informing the user of a first date of the at least one calendar date associated with a first event profile of the at least one event profile.

20. The method of claim 19, further comprising displaying on the first date at least one of a symbol and color associated with the first event profile.

* * * * *